(12) United States Patent
Ichihara

(10) Patent No.: US 8,396,176 B2
(45) Date of Patent: Mar. 12, 2013

(54) OFDM RECEIVING DEVICE AND OFDM RECEIVING METHOD

(75) Inventor: Masaki Ichihara, Tokyo (JP)

(73) Assignee: NEC Corporation, Tokyo (JP)

( * ) Notice: Subject to any disclaimer, the term of this patent is extended or adjusted under 35 U.S.C. 154(b) by 302 days.

(21) Appl. No.: 12/863,939

(22) PCT Filed: Jan. 27, 2009

(86) PCT No.: PCT/JP2009/051676
§ 371 (c)(1),
(2), (4) Date: Jul. 21, 2010

(87) PCT Pub. No.: WO2009/099016
PCT Pub. Date: Aug. 13, 2009

(65) Prior Publication Data
US 2010/0296609 A1 Nov. 25, 2010

(30) Foreign Application Priority Data
Feb. 4, 2008 (JP) ................. 2008-023749

(51) Int. Cl.
| H03D 1/04 | (2006.01) |
| H03D 1/06 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |

(52) U.S. Cl. ........ 375/346; 375/371; 375/373; 375/376; 375/260; 455/63.1; 455/65; 455/296

(58) Field of Classification Search .................. 375/346, 375/329, 340, 371, 373, 376, 260; 455/63.1, 455/65, 296
See application file for complete search history.

(56) References Cited

U.S. PATENT DOCUMENTS
7,453,792 B2 * 11/2008 Chadha et al. ................ 370/203

FOREIGN PATENT DOCUMENTS
| JP | 2001094525 A | 4/2001 |
| JP | 2002314506 A | 10/2002 |
| JP | 2002344414 A | 11/2002 |
| JP | 2003273829 A | 9/2003 |
| JP | 2004320738 A | 11/2004 |
| JP | 2007189646 A | 7/2007 |
| WO | 2008010549 A | 1/2008 |

* cited by examiner

Primary Examiner — Phuong Phu

(57) ABSTRACT

An OFDM receiving device for settling a problem of complicated configuration is provided, in that the OFDM receiving device receives an OFDM signal where no smaller than one specific sub-carriers among plurality of sub-carriers are modulated by a known modulation signal $s_k(t)$, and includes a converting means for converting the received OFDM signal into the received signals for each sub-carrier, an extracting means for extracting the ingredient caused by a frequency drift and a phase noise based on received signal $r_k(t)$ of the specific sub-carrier and the known modulation signal $s_k(t)$, and a compensating means for H) compensating the received signal of the sub-carrier using the extracted ingredient.

17 Claims, 11 Drawing Sheets

OFDM RECEIVING DEVICE AND OFDM RECEIVING METHOD

TECHNICAL FIELD

The present invention relates to a receiving device, a receiving method, a communication system, and a program for receiving device, using Orthogonal Frequency Division Multiplex (OFDM) system, and in particular relates to a receiving device, a receiving method, a communication system, and a program for a receiving device that can compensates frequency drift and decreases phase noise of a demodulated OFDM signal.

BACKGROUND ART

In recent years, in a field of mobile communications, Direct Sequence Spread Spectrum (DS-SS) systems such as Code Division Multiple Access (CDMA) systems and Wideband-CDMA (W-CDMA) systems are widely used. However, OFDM systems are more efficient than DS-SS systems from a point of view of frequency utilization efficiency. For this reason, OFDM systems are successively adopted for large-volume data communication systems. The followings are brief descriptions of a basic composition of the OFDM system.

FIG. 7 is a diagram showing fundamental composition of a communication system of the OFDM system. A transmitting device 51 includes an inverse Fast Fourier transformer (IFFT), an orthogonal modulator 2, a local oscillator 3, and an amplifier 4.

In addition, a receiving device 52 includes an amplifier 7, an orthogonal demodulator 8, a local oscillator 9, and a Fast Fourier transformer (FFT). And the communication system indicated in FIG. 7 transmits a signal using in total 2n sub-carriers included in #(1−n) to #(n).

In the transmitting device 51, modulated signals $s_{1-n}(t)$, $s_{2-n}(t)$, $s_{3-n}(t)$, ..., $s_{-1}(t)$, $s_0(t)$, $s_1(t)$, ..., $s_n(t)$ corresponding to 2n sub-carriers respectively are inputted to the inverse Fast Fourier transformer (IFFT) 1 and are executed inverse Fourier transform. Through the stated process, a baseband OFDM signal is created. This baseband OFDM signal can be expressed by an equation (1).

$$F(t) = \sum_{i=1-n}^{n} s_i(t) \cdot \exp j(i\omega_o t) \quad (1)$$

Here, $\omega_0$ is an angular frequency representing sub-carrier interval.

The orthogonal modulator 2 complex-multiplies the baseband OFDM signal by a transmitted local signal from the local oscillator 3. The transmitted local signal can be expressed by an equation (2).

$$L_1(t) = \exp j\{\omega_c t + \phi(t)\} \quad (2)$$

Here, $\omega_c$ is a carrier angular frequency and $\phi(t)$ is a phase noise of the transmitted local signal.

An OFDM signal at the Radio Frequency (RF) band after it was complex-multiplied and generated by the orthogonal modulator 2 can be expressed by the following equation (3) using the above-mentioned equations (1) and (2).

$$O(t) = F(t) \cdot L_1(t) = \sum_{i=1-n}^{n} s_i(t) \cdot \exp j\{(i\omega_o + \omega_c)t + \phi(t)\} \quad (3)$$

The transmitting device 51 amplifies the RF band OFDM signal expressed in the equation (3) in the amplifier 4. The antenna 5 transmits the signal amplified in the amplifier 4. Although high pass filters and others are included in the RF circuits, these descriptions are omitted in FIG. 7.

The receiving device 52 amplifies a signal received by the antenna 6 in the amplifier 7. Then, the orthogonal demodulator 8 complex-multiplies the received signal amplified in the amplifier 7 by a received local signal which is expressed by the following equation (4) that the local oscillator 9 outputs.

$$L_2(t) = \exp[-j\{(\omega_c - \Delta\omega)t - \theta(t)\}] \quad (4)$$

Here, $\omega_c$ is a carrier angular frequency and $\theta(t)$ is a phase noise of the received local signal.

The demodulated OFDM signal obtained by the orthogonal demodulator 8 is expressed by the following equation (5) from the equations (3) and (4).

$$F_2(t) = A \cdot O(t) \cdot L_2(t) = A \sum_{i=1-n}^{n} s_i(t) \cdot \exp j \left\{ \begin{array}{c} (i\omega_o + \Delta\omega)t + \\ \phi(t) + \theta(t) \end{array} \right\} \quad (5)$$

Here, "A" is an amplification degree of a transmission path.

The Fourier transformer 10 executes Fourier transform to the demodulated OFDM signal. Then, the Fourier transformer 10 outputs demodulated signals $r_{1-n}(t)$, $r_{2-n}(t)$, $r_{3-n}(t)$, ..., $r_n(t)$ corresponding to 2n sub-carriers respectively. Demodulated signal $r_i(t)$ is expressed by the following equation (6), where i=1−n, 2−n, ..., n.

$$r_i(t) = A \cdot s_i(t) \cdot \exp j\{\Delta\omega t + \phi(t) + \theta(t)\} \quad (6)$$

As indicated in the equation (6), the demodulated OFDM signal includes a frequency drift $\Delta\omega$ and a phase noise $\phi(t) + \theta(t)$.

This situation is shown in FIG. 8. FIG. 8 is a diagram showing spectrums of the modulated signal both in the transmitting device and in the receiving device. FIG. 8(A) is a diagram showing a spectrum of 2n modulated signals in the transmitting device. In addition, FIG. 8(B) is a diagram showing a spectrum of the demodulated signals in the receiving device. Corresponding to the modulated signals $s_{1-n}(t)$, $s_{2-n}(t)$, $s_{3-n}(t)$, ..., $s_n(t)$ in the transmitting device, the demodulated signals $r_{1-n}(t)$, $r_{2-n}(t)$, $r_{3-n}(t)$, ..., $r_n(t)$ in the receiving device include the frequency drift $\Delta\omega$ and the phase noise $\phi(t) + \theta(t)$.

As is well-known, interval of frequencies between sub-carriers are very narrow in the OFDM system, and is ranging from kHz to tens-kHz.

For this reason, the OFDM system has a problem that the system is easily affected by influences of the frequency drifts and the phase noises. Accordingly, the various technologies are proposed for settling the problem. For example, an OFDM receiving method disclosed in Japanese Patent Application Laid-Open No. 2001-94525 proposed to calculate drift of a sampling time τ and a phase shift θ from plurality set of two pilot carriers and compensate the sampling time and the phase of all sub-carriers based on the calculated τ and θ. And the OFDM receiving method disclosed in the document further calculates τ and θ from plurality of compensated sub-carriers and once again compensates all compensated sub-carriers.

DISCLOSURE OF THE INVENTION

Technical Problem

In order to calculate τ and θ, the OFDM receiving method mentioned above is considering the case when amplitude and phase of two selected pilot carriers are influenced by noises and performing further compensations. For this reason, the proposed OFDM receiving method had a difficulty that a configuration is complicated.

The object of the present invention is to provide an OFDM receiving device, an OFDM receiving method, a communication system, and a control program, for the OFDM receiving device, that settle the problem of complicated configurations of the OFDM receiving method.

Technical Solution

An OFDM receiving device in the present invention includes a converting unit for converting a received OFDM signal where no smaller than one specific sub-carriers among plurality of sub-carriers are modulated by a known modulation signal into a received signal of each sub-carrier; an extracting unit for extracting an ingredient caused by a frequency drift and a phase noise of the sub-carrier based on the received signal of the specific sub-carrier and the known modulation signal; and a compensating unit for compensating the received signal of the sub-carrier using the extracted ingredient.

In addition, the OFDM receiving device in the present invention includes a converting unit for converting the received OFDM signal where plurality of sub-carriers of the OFDM signal are divided into plurality of groups and the OFDM receiving devices receives an OFDM signal where at least one specific sub-carrier is modulated by a known modulation signal on each group into the received signal for each the sub-carrier; and a compensation circuit block installed in the each plurality of groups, wherein each compensation circuit block includes an extracting unit for extracting an ingredient caused by a frequency drift and a phase noise of the sub-carrier based on the received signal of the specific sub-carrier of the group and a known modulation signal of the sub-carrier; and a compensating unit for compensating the received signal of the sub-carrier of the group using the extracted ingredient.

Further, an OFDM receiving method in the present invention is characterized in that a receiving method in the OFDM receiving device receives the OFDM signal where no smaller than one specific sub-carriers among plurality of sub-carriers is modulated by a known modulation signal, and includes converting the received OFDM signal into the received signal for each sub-carrier, extracting the ingredient caused by the frequency drift and the phase noise of the sub-carrier based on the received signal of the specific sub-carrier and the known modulation signal, and compensating the received signal of the sub-carrier using the extracted ingredient.

Moreover, a communication system in the present invention includes converting the received OFDM signal where no smaller than one specific sub-carriers among plurality of sub-carriers are modulated by a known modulation signal into a received signal for each sub-carrier; extracting an ingredient caused by a frequency drift and a phase noise of the sub-carrier based on the received signal of the specific sub-carrier and the known modulation signal; and compensating the received signal of the sub-carrier using the extracted ingredient.

Advantageous Effects

The present invention provides an OFDM receiving device, an OFDM receiving method, and a program for the OFDM receiving device capable of removing frequency drifts and phase noises without complicating composition of the receiving device.

Figure 1:
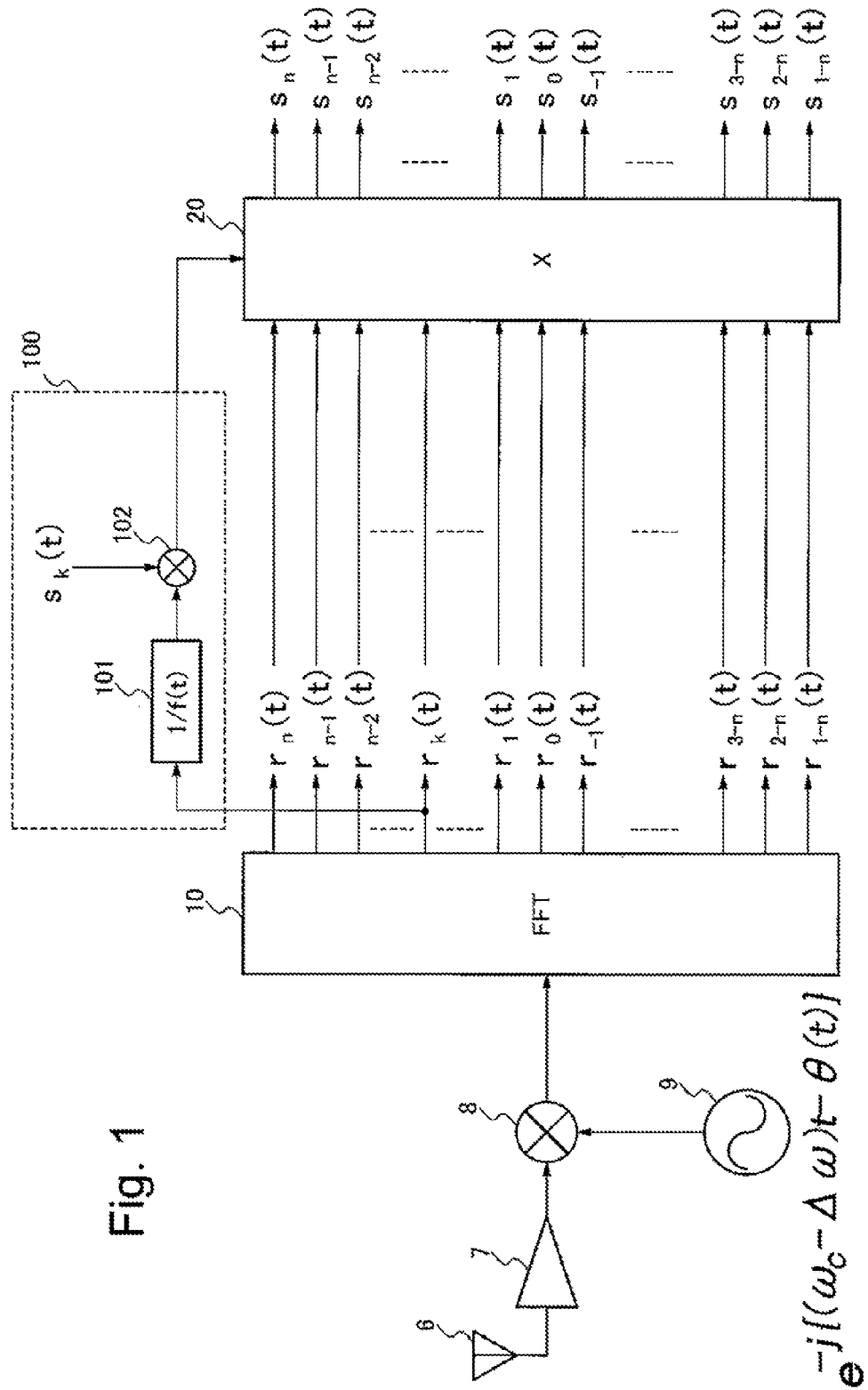
FIG. 1 is a diagram showing a composition of the OFDM receiving device in the first exemplary embodiment of the present invention.

EXPLANATION OF REFERENCE 6 antenna
7 amplifier
8 orthogonal modulator
9 local oscillator
10 Fourier transformer
20 multiplier
51 transmitting device
52 receiving device
100, 100a extraction circuit
101 reciprocal arithmetic unit
102 multiplier
200 extraction circuit
201 reciprocal arithmetic unit
202 multiplier
203 reciprocal arithmetic unit
204 multiplier
205 adder
206 divider
300 extraction circuit
301 complex conjugation arithmetic unit
302 multiplier
303 normalization circuit
400 compensation circuit block 401 reciprocal arithmetic unit
402 multiplier
403 multiplier
500 extracting means
510 converting means
520 compensating means
600 central processing unit
601 storage unit

BEST MODE FOR CARRYING OUT THE INVENTION

1. Brief Summary of the Invention

As mentioned above, signal $r_i(t)$ demodulated by the OFDM receiving device is expressed in a equation (6), where i=1−n, 2−n, n.

$$r_i(t) = A \cdot s_i(t) \cdot \exp j\{\Delta\omega t + \phi(t) + \theta(t)\} \quad (6)$$

In this way, the demodulated OFDM signal includes the frequency drift $\Delta\omega$ and the phase noise $\phi(t)+\theta(t)$. Here, it is noted that the frequency drift $\Delta\omega$ and the phase noise $\phi(t)+\theta(t)$ are added equally to all sub-carriers.

When the affected amount of the frequency drift $\Delta\omega$ and the phase noise from a specific sub-carrier can be extracted using the fact noted above, the frequency drifts and the phase noises of all received sub-carriers can be compensated using the affected amount.

The receiving device extracts an ingredient caused by the frequency drift $\Delta\omega$ and the phase noise from the demodulated signal using a reference signal (i.e. reference signal or pilot signal) whose modulation pattern is known by the receiving device. And the receiving device compensates the frequency drift and the phase noise of all the sub-carriers using the extracted ingredient. Hereinafter, the exemplary embodiments of the present invention will be described in detail.

2. First Exemplary Embodiment

FIG. 1 is the block diagram showing a composition of the OFDM receiving device in the first exemplary embodiment of the present invention.

Figure 7:
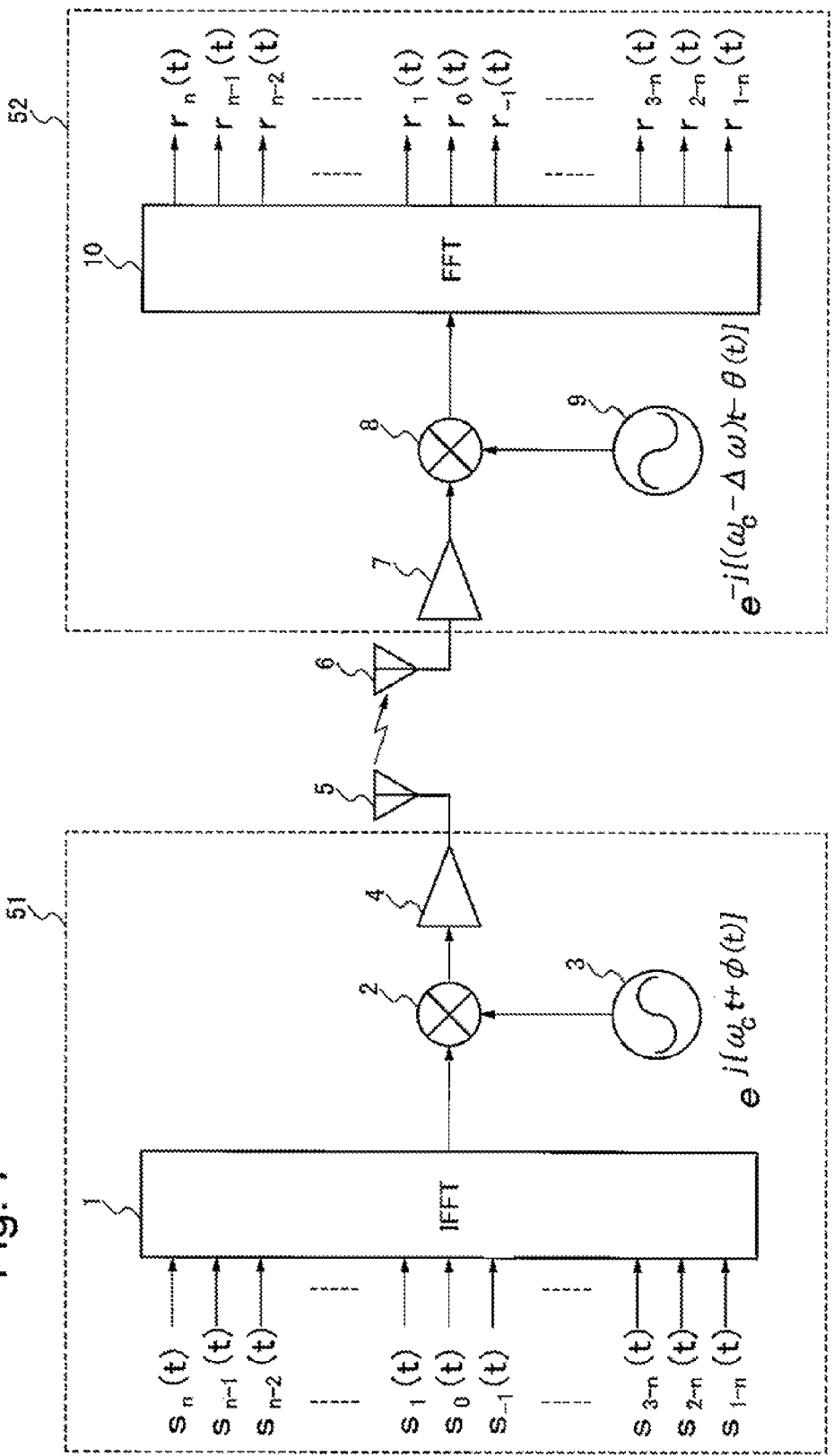
FIG. 7 is a diagram showing a composition of a basic communication system using the OFDM system.
Figure 8:
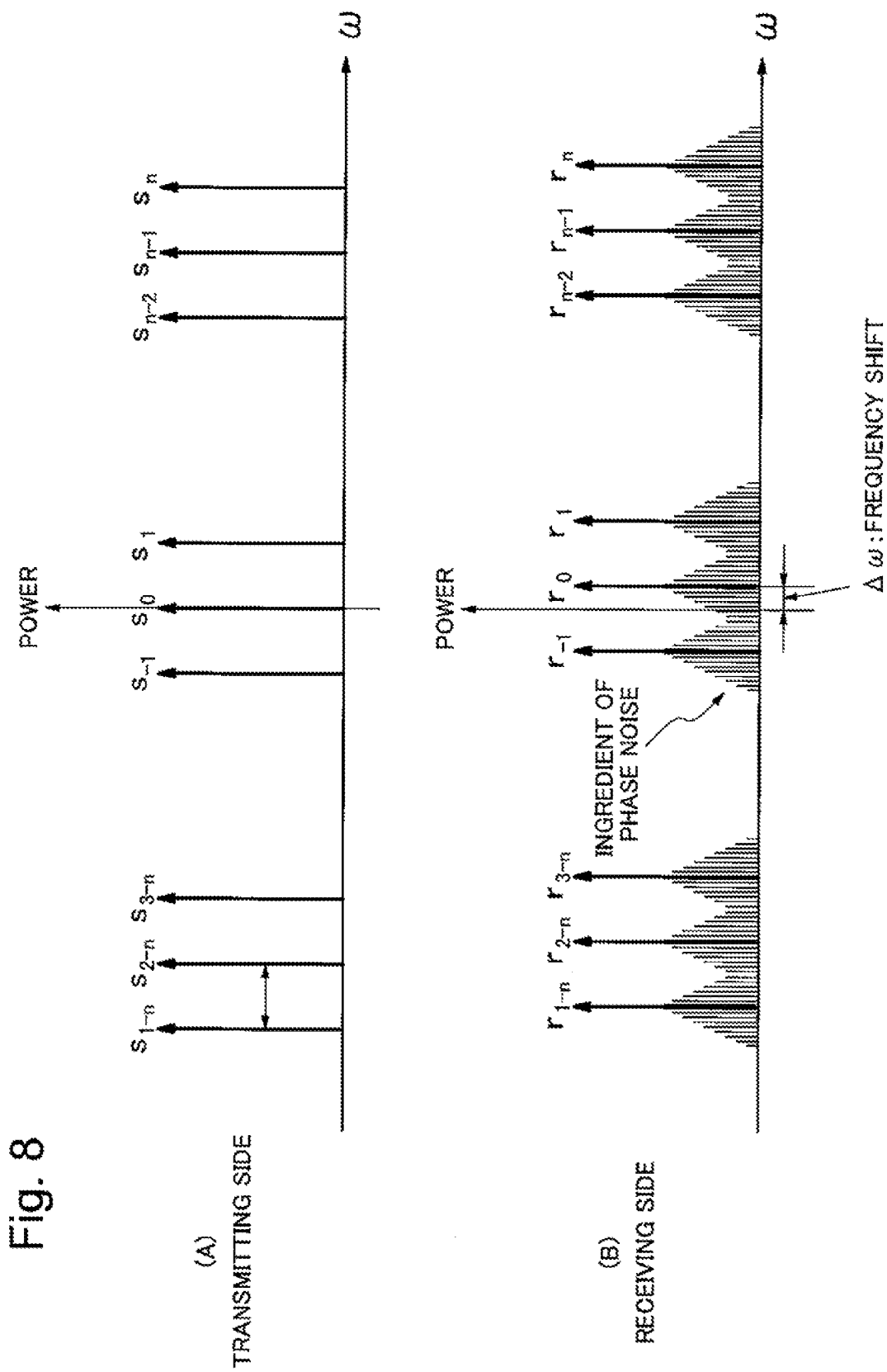
FIG. 8 is a diagram showing spectrums of the modulated signal both in the transmitting device and in the receiving device.

Here, the composition of the transmitter (not shown in FIG. 1) and the composition of the antenna 6, the amplifier 7, the orthogonal demodulator 8, the local oscillator 9, and the Fourier transformer 10, of the OFDM receiving device, are similar to the receiving device 52 that is shown in FIG. 7. That is, in the first exemplary embodiment, the Fourier transform is executed by the Fourier transformer 10 on the OFDM signal which is demodulated by the orthogonal demodulator 8. And, the Fourier transformer 10 outputs demodulated signals $r_{1-n}(t), r_{2-n}(t), r_{3-n}(t), \ldots, r_n(t)$ corresponding to 2n sub-carriers respectively.

The OFDM receiving device in the first exemplary embodiment includes a compensation circuit which includes an extraction circuit 100 and a compensation unit 20. The extraction circuit 100 includes a reciprocal arithmetic unit 101 and a multiplier 102. The reciprocal arithmetic unit 101 calculates a reciprocal of a demodulated signal of a specific carrier, and the multiplier 102 extracts a ingredient caused by the frequency drift ACJ and the phase noise of the specific carrier by multiplying the output of the reciprocal arithmetic unit 101 by a known modulation signal (hereinafter, referred to as a reference signal) of the specific carrier, and outputs it to the compensation unit 20.

The compensation unit 20 multiplies each (n) of demodulated signals $r_{1-n}(t), r_{2-n}(t), r_{3-n}(t) \ldots, r_n(t)$ by the contributing amount of the frequency drift $\Delta\omega$ and phase noise that is obtained by the extraction circuit 100. As a result, the compensation unit 20 can recover the same modulated signals $s_{1-n}(t), s_{2-n}(t), s_{3-n}(t), \ldots, s_n(t)$ as the transmission side. Hereinafter, it is described in detail.

Supposing that a modulated signal $s_k(t)$ of the k-th sub-carrier is a known reference signal at the receiving side, the extraction circuit 100 inputs demodulated signal $r_k(t)$ obtained by the Fourier transformer 10 and calculates the reciprocal in the reciprocal arithmetic unit 101.

It can get a result of arithmetic operation of the reciprocal arithmetic unit 101 by the equation (6).

$$\frac{1}{r_k(t)} = \frac{1}{A} \cdot \frac{1}{S_k(t)} \cdot \exp[-j\{\Delta\omega t + \phi(t) + \theta(t)\}] \quad (7)$$

Then, the multiplier 102 multiplies the reference signal $s_k(t)$ by the equation (7).

As a result, the multiplier 102 can get the ingredient caused by the frequency drift $\Delta\omega$ and the phase noise as indicated in the following equation (8).

$$\frac{S_k(t)}{r_k(t)} = \frac{1}{A} \cdot \exp[-j\{\Delta\omega t + \phi(t) + \theta(t)\}] \quad (8)$$

The multiplication result of the multiplier 102 is outputted to the compensation unit 20. The compensation unit 20 multiplies each demodulated signal $r_i(t)$ by the multiplication result. As a result, as shown in the following equation (9), the original modulated signal $s_i(t)$ ran be recovered.

$$r_i(t) \cdot \frac{S_k(t)}{r_k(t)} = A \cdot s_i(t) \cdot \exp j\{\Delta\omega t + \phi(t) + \theta(t)\} \cdot \quad (9)$$
$$\frac{1}{A} \cdot \exp[-j\{\Delta\omega t + \phi(t) + \theta(t)\}]$$
$$= s_i(t)$$

Thus, the first exemplary embodiment gets a merit that the ingredient caused by the frequency drift $\Delta\omega$ and the phase noise from all sub-carriers can be removed without using a complicated configuration.

Modification of the First Exemplary Embodiment

Figure 2:
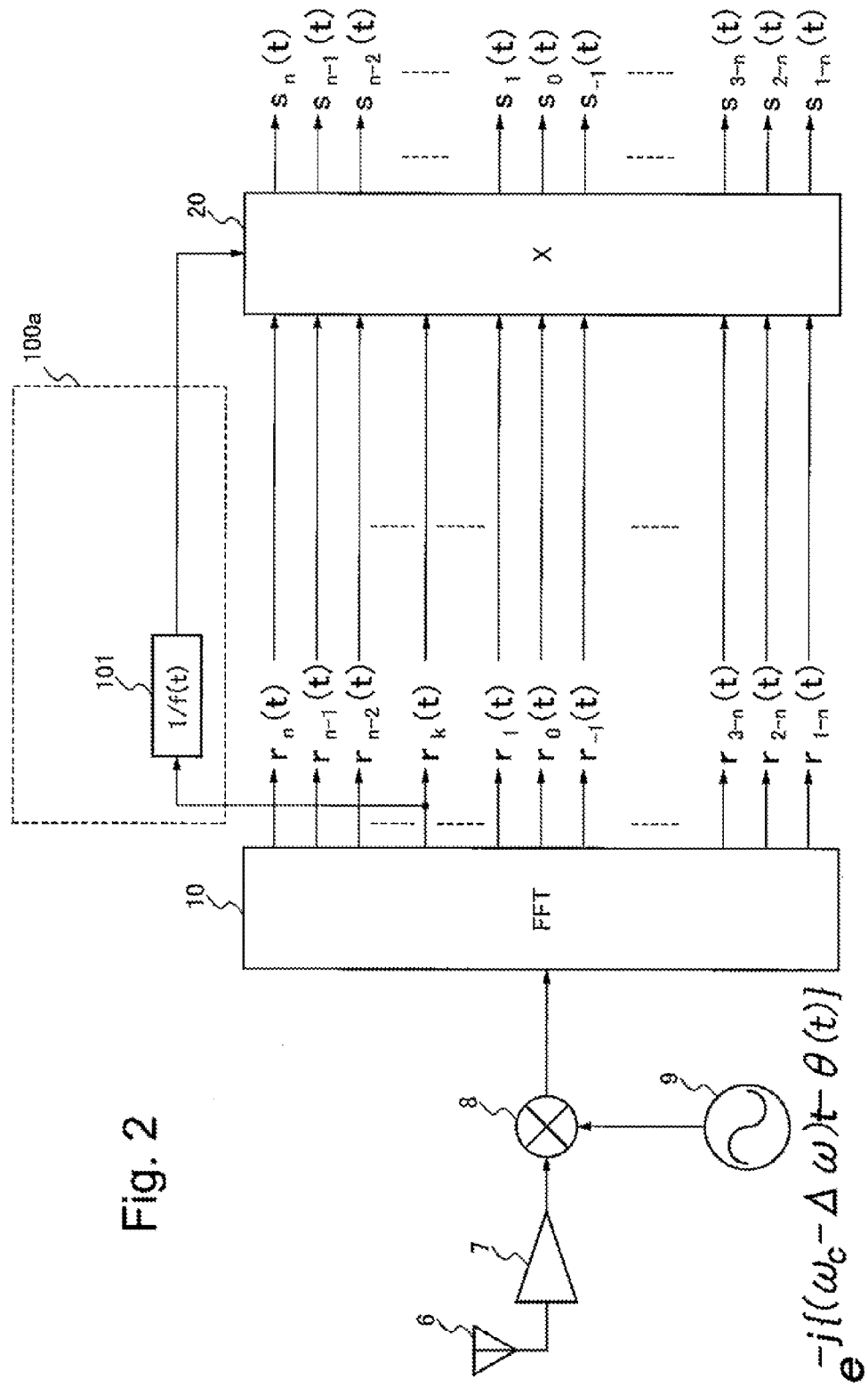
FIG. 2 is a block diagram showing a composition of the OFDM receiving device in a modification of the first exemplary embodiment of the present invention.

According to the first exemplary embodiment as shown in FIG. 1, $s_k(t)$ was set as a reference signal. However, when $s_k(t)$ is a constant value independent from time t (suppose it is "1", in this case), as shown in FIG. 2, the multiplier 102 can be removed from the extraction circuit 100. As a result, the modification of the first exemplary embodiment gives a merit that the circuit configuration of the OFDM receiving device becomes simple.

FIG. 2 is a block diagram showing the composition of the OFDM receiving device in the modification of the first exemplary embodiment. Note that the same reference numbers are assigned to the same blocks as the first exemplary embodiment, and the descriptions are omitted.

As shown in FIG. 2, the extraction circuit 100a inputs demodulated signal $r_k(t)$ obtained by the Fourier transformer 10, and the reciprocal is calculated by the reciprocal arithmetic unit 101. If $s_k(t)$ is a constant value "1" and is not depended on time t, because the above-mentioned equation (8) is obtained without multiplying by $s_k(t)$, the extraction circuit 100a may output the output of reciprocal arithmetic unit 101 to the compensation unit 20 just as it is.

Further, when $s_k(t)$ is a constant value other than "1" and does not depend on time t, the signal amplitude may be adjusted properly. Accordingly, even in this case, the multiplier 102 is not requested as is similar to FIG. 2.

3. Second Exemplary Embodiment

According to the above-mentioned first exemplary embodiment, the OFDM receiving device extracted the ingredient caused by the frequency drift $\Delta\omega$ and the phase noise using a specific sub-carrier. In addition, the OFDM receiving device can extract the ingredient caused by the frequency drift $\Delta\omega$ and the phase noise using plurality of specific sub-carriers. Hereinafter, the case on how to extrapolate the ingredient caused by the frequency drift $\Delta\omega$ and the phase noise is described using two specific sub-carriers (k-th and −k-th).

Figure 3:
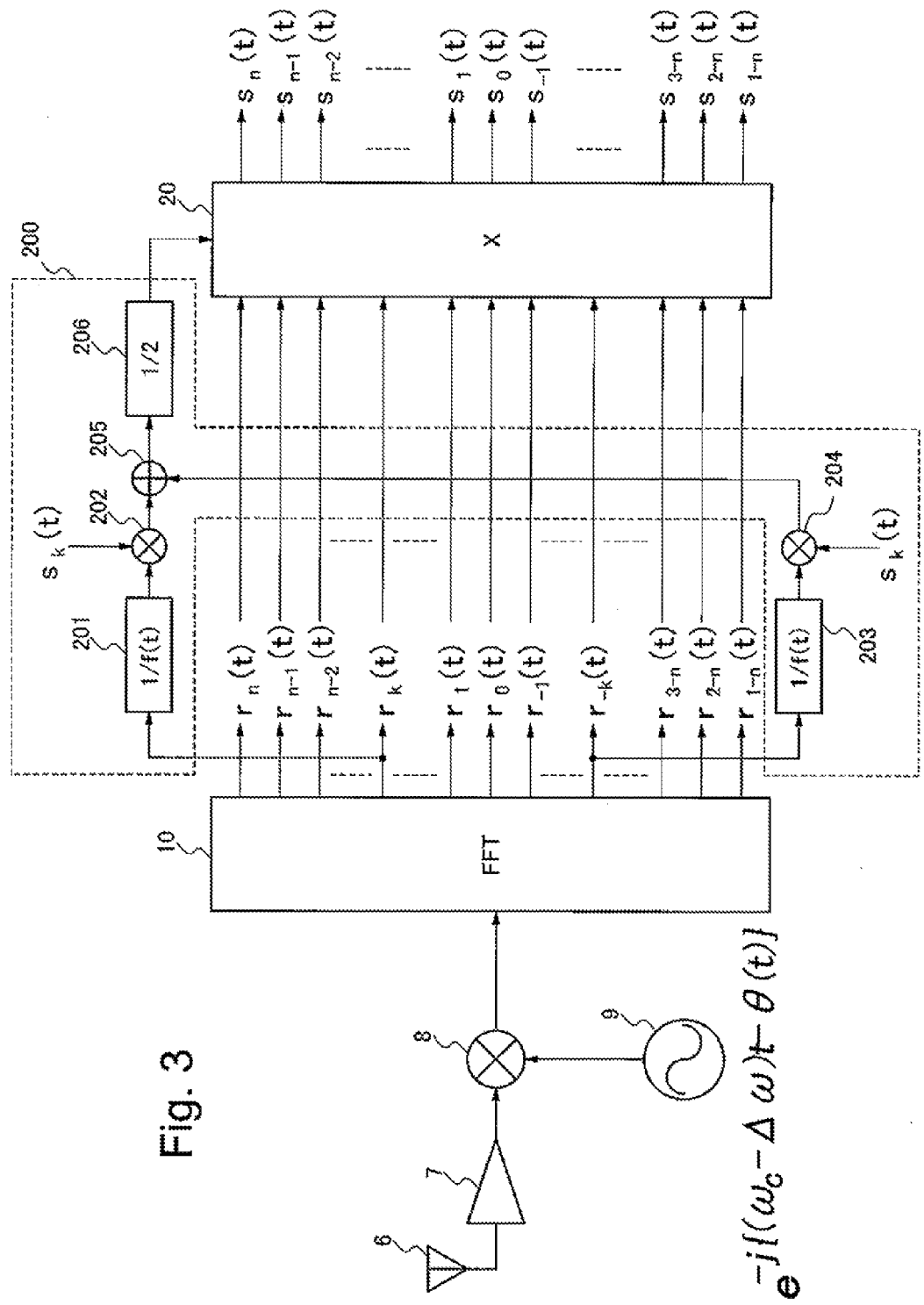
FIG. 3 is a block diagram showing a composition of the OFDM receiving device in the second exemplary embodiment of the present invention.

FIG. 3 is a block diagram showing a composition of the OFDM receiving device in the second exemplary embodiment of the present invention. Here, the composition of the transmitting device (not shown in FIG. 3) and the antenna 6, the amplifier 7, the orthogonal demodulator 8, the local oscillator 9, and the Fourier transformer 10, of the OFDM receiving device, are similar to the receiving device 52 shown in FIG. 7. In addition, the same reference numbers are assigned to the same blocks having the same functions as the first exemplary embodiment that is shown in FIG. 1. That is, even in this exemplary embodiment, the Fourier transformer 10 executes Fourier transform for the demodulated OFDM signal. And the Fourier transformer 10 outputs demodulated signals $r_{1-n}(t), r_{2-n}(t), r_{3-n}(t), \ldots, r_n(t)$ corresponding to 2n sub-carriers respectively to the multiplier unit 20.

An extraction circuit 200 in this exemplary embodiment includes a reciprocal arithmetic unit 201 for k-th specific sub-carrier demodulated signal $r_k(t)$, a compensation unit 202 using a reference signal $s_k(t)$, a reciprocal arithmetic unit 203 for −k-th specific sub-carrier demodulated signal $r_{-k}(t)$, and a compensation unit 204 using reference signal $s_{-k}(t)$. Because reciprocal calculation process and multiplication process in the reciprocal arithmetic unit 201, the reciprocal arithmetic unit 203, and the multiplier unit 20 are basically the same as the calculation that is indicated in the equations (7) and (8) mentioned above, the description will be omitted.

The obtained ingredients caused by the frequency drift $\Delta\omega$ and the phase noise in the k-th and −k-th specific sub-carrier are outputted after being averaged by an adder 205 and a divider 206 to the compensation unit 20. According to the exemplary embodiment, because it added two specific sub-carriers in the adder 205, the divider 206 halves the output of the adder 205. Similarly, when the OFDM receiving device uses N-pieces of the specific sub-carrier, the equal result can be obtained by multiplying by 1/N the output of the adder 205 in the divider 206.

As mentioned above, the compensation unit 20 multiplies each ($r_i$) of demodulated signals $r_{1-n}(t), r_{2-n}(t), r_{3-n}(t), \ldots, r_n(t)$ by the ingredient caused by the frequency drift $\Delta\omega$ and the phase noise which is obtained by the extraction circuit 200.

As a result, the compensation unit 20 can recover the same modulated signals $s_{1-n}(t), s_{2-n}(t), s_{3-n}(t), \ldots, s_n(t)$ of the transmitting side. Further, when plurality of sub-carriers which transmit a known reference signal exist, after performing a calculation of the equation (8) to each of the sub-carriers, the OFDM receiving device of the second exemplary embodiment adds-averages the result. As a result, the OFDM receiving device of the second exemplary embodiment can decrease a quantization noise without using a complicated configuration. Accordingly, the second exemplary embodiment has a merit that the precise compensation can be achieved.

4. Third Exemplary Embodiment

Figure 4:
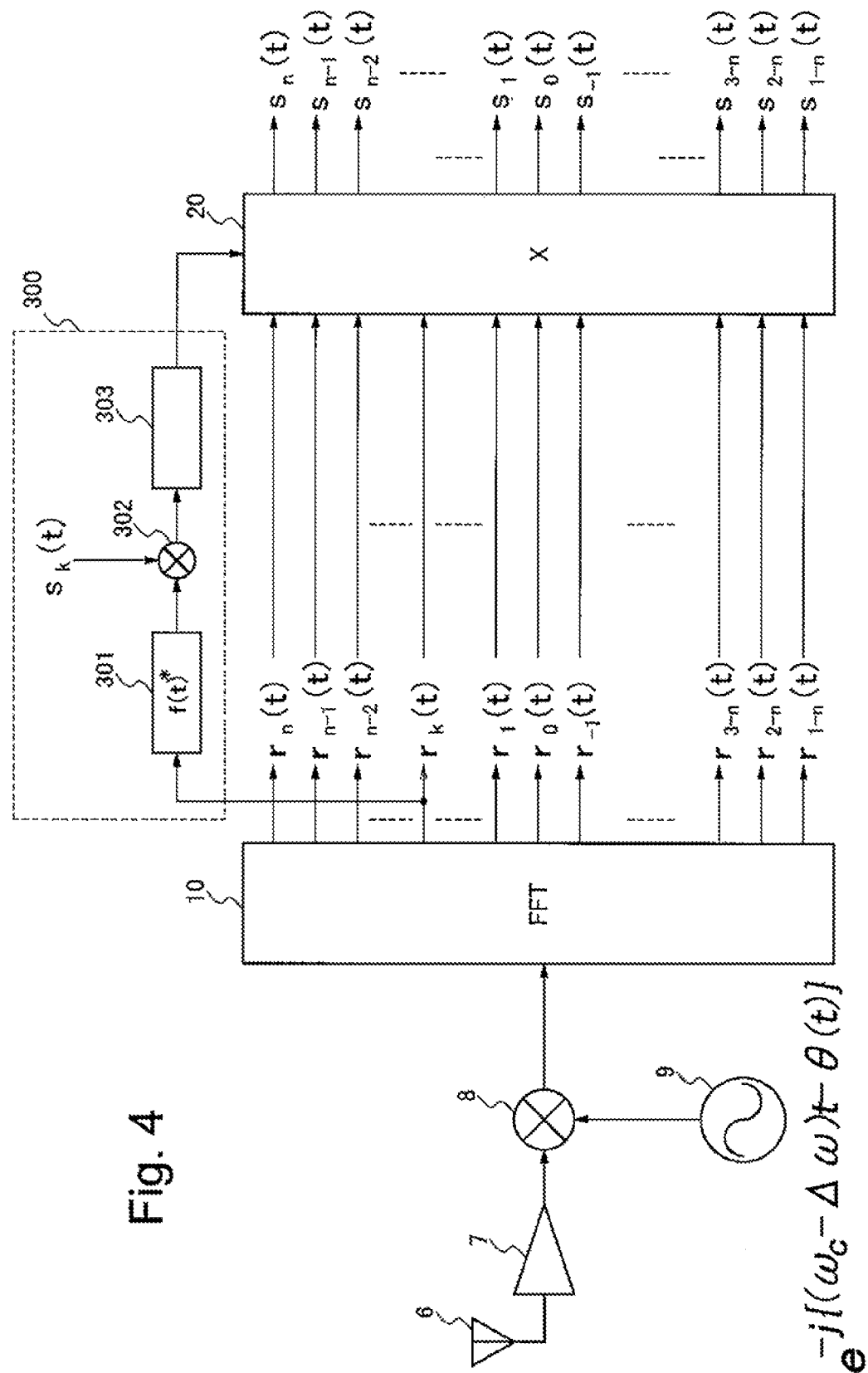
FIG. 4 is a block diagram showing a general composition of the OFDM receiving device in the third exemplary embodiment of the present invention.

According to the first and the second exemplary embodiment mentioned above, the OFDM receiving device calculated the reciprocal of demodulated signal $r_k$ of the specific sub-carrier using the reciprocal arithmetic unit 101 and 201, and multiplied by the reference signal $s_k$. As shown in FIG. 4, a configuration wherein the OFDM receiving device calculates the complex conjugation of the demodulated signal $r_k$ is also possible instead of a configuration wherein it calculates the reciprocal of demodulated signal $r_k$. And the configuration of the circuit which calculates the complex conjugation will be simpler than the configuration of the circuit which calculates the reciprocal.

FIG. 4 is a block diagram showing a composition of the OFDM receiving device in the third exemplary embodiment of the present invention. Here, the composition of the transmitting device (not shown in FIG. 4) and the antenna 6, the amplifier 7, the orthogonal demodulator 8, the local oscillator 9, and the Fourier transformer 10, of the OFDM receiving device, are similar to the receiving device 52 described in FIG. 7. In addition, the same reference numbers are assigned to the same blocks having the same functions as the first exemplary embodiment that is shown in FIG. 1. That is, even in the present exemplary embodiment, the Fourier transformer 10 executes Fourier transform of the demodulated OFDM signal. And the Fourier transformer 10 outputs the demodulated signals $r_{1-n}(t), r_{2-n}(t), r_{3-n}(t), \ldots, r_n(t)$ corresponding to 2n sub-carriers respectively to the multiplier unit 20.

An extraction circuit 300 in the present exemplary embodiment includes a complex conjugation arithmetic unit 301, a multiplier 302, and a normalization circuit 303, for k-th specific sub-carrier demodulated signal $r_k(t)$. The complex conjugation arithmetic unit 301 calculates a complex conjugation signal $r_k(t)^*$ of a demodulated signal $r_k(t)$, and outputs the complex conjugation signal $r_k(t)^*$ to the multiplier 302. The multiplier 302 complex-multiplies the complex conjugation signal $r_k(t)^*$ by the reference signal $s_k(t)$, and outputs the output indicated by the following equation (10) to the normalization circuit 303.

$$r_k(t)^* \cdot S_k(t) = A \cdot |s_i(t)|^2 \cdot \exp[-j\{\Delta\omega t + \phi(t) + \theta(t)\}] \quad (10)$$

The output of the multiplier 302 includes an amplitude ingredient A. For this reason, the normalization circuit 303 multiplies the amplitude of the output of the multiplier 302 by $1/A^2$ and outputs the output of the normalization circuit 303 to the compensation unit 20.

Further, a reference signal $s_k(t)$ is a pattern signal that changes periodically with a prefixed cycle, and if the signal is either a binary Phase Shift Keying (BPSK) modulated signal or Quadrature PSK (QPSK) modulated signal with absolute value "1", the following equation (11) can be used instead of the equation (10).

$$r_k(t)^* \cdot S_k(t) = A \cdot |s_i(t)|^2 \cdot \exp[-j\{\Delta\omega t + \phi(t) + \theta(t)\}] = A \cdot \exp[-j\{\Delta\omega t + \phi(t) + \theta(t)\}] \quad (11)$$

Thus, because the calculated $r_k(t)^* \cdot s_k(t)$ is complex-multiplied by each demodulated signal $r_i(t)$ using the compensation unit 20, the third exemplary embodiment has a merit of compensating the frequency drift and the phase noise without using a complicated configuration.

Further, the extraction circuit 300 in the exemplary embodiment may be adopted instead of the reciprocal arithmetic unit and the multiplier in the second exemplary embodiment.

5. Fourth Exemplary Embodiment

The phase noise is also caused by a phase characteristics of a RF filter in addition to a local phase noise. The phase characteristics change in accordance with a frequency. Accordingly, it is difficult to cancel the phase noise with compensating by using one or two specific sub-carriers.

The fourth exemplary embodiment of the present invention assumed a case when the phase noise of demodulated signal $r_i(t)$ changes according to the frequency. In the fourth exemplary embodiment, 2n sub-carriers are included in groups and each group includes L sub-carriers. And, the frequency drift and the phase noise are compensated on each group. According to the frequency dependency of the phase noise, the value L may be selected so as transmission rate does not decline. The following exemplary embodiment describes a circuit where 2n demodulated signals are divided into groups and each group has four demodulated signals.

Figure 5:
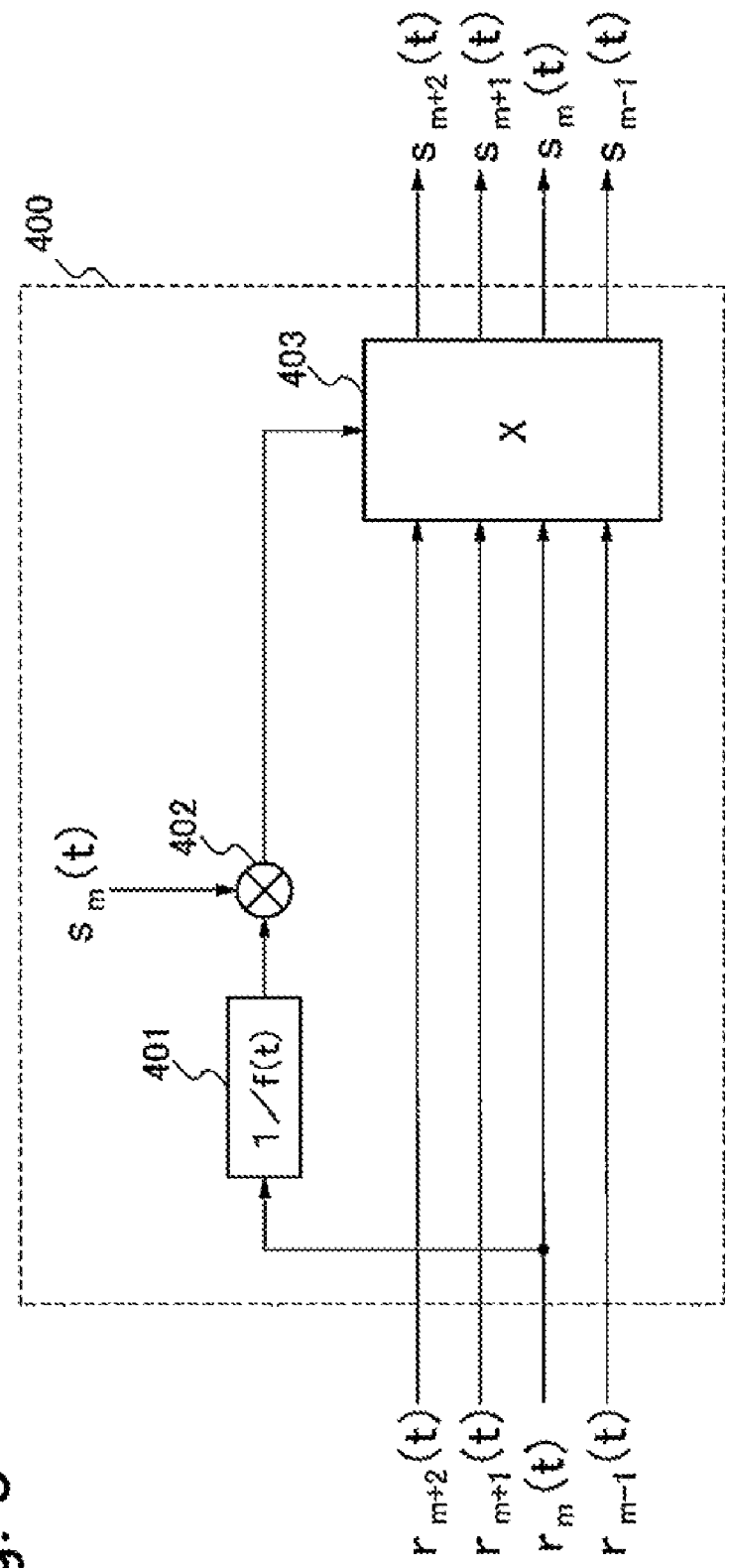
FIG. 5 is a circuit diagram of the optional compensation circuit block consisting of four sub-carriers.

FIG. 5 is a circuit diagram of an optional compensation circuit block consisting of four sub-carriers. The compensation circuit block inputs demodulated signal of four sub-carriers $r_{m+2}(t)$, $r_{m+1}(t)$, $r_m(t)$, and $r_{m-1}(t)$, and extracts an ingredient caused by the frequency drift $\Delta\omega$ and the phase noise by the extraction circuit that is similar to the first exemplary embodiment. That is, a reciprocal arithmetic unit 401 calculates a reciprocal of demodulated signal $r_m(t)$ of a specific sub-carrier. A multiplier 402 complex-multiplies the calculated result of the reciprocal by a reference signal $s_m(t)$ of a specific career concerned. As a result of the complex-multiplying, the ingredient caused by the frequency drift $\Delta\omega$ and the phase noise of the specific carrier is extracted. The multiplier 402 outputs the result of complex-multiplying to a multiplier 403.

The multiplier 403 multiplies each of demodulated signals $r_{m+2}(t)$, $r_{m+1}(t)$, $r_m(t)$, and $r_{m-1}(t)$ by the ingredient caused by the extracted frequency drift $\Delta\omega$ and phase noise. As a result, the compensation circuit block can recover the same modulated signals $s_{m+2}(t)$, $s_m(t)$, and $s_{m-1}(t)$, that are the same as the transmitting side.

As shown in the configuration FIG. 5, the ingredient caused by the frequency drift $\Delta\omega$ and the phase noise of a specific carrier is extracted using at least one specific sub-carrier for each group. This configuration makes it possible to precisely compensate the frequency drift and the phase noise in the sub-carrier group for each group. Further, although number of sub-carriers included in one group is set to four in the above-mentioned exemplary embodiment, it is possible to set other than four.

Figure 6:
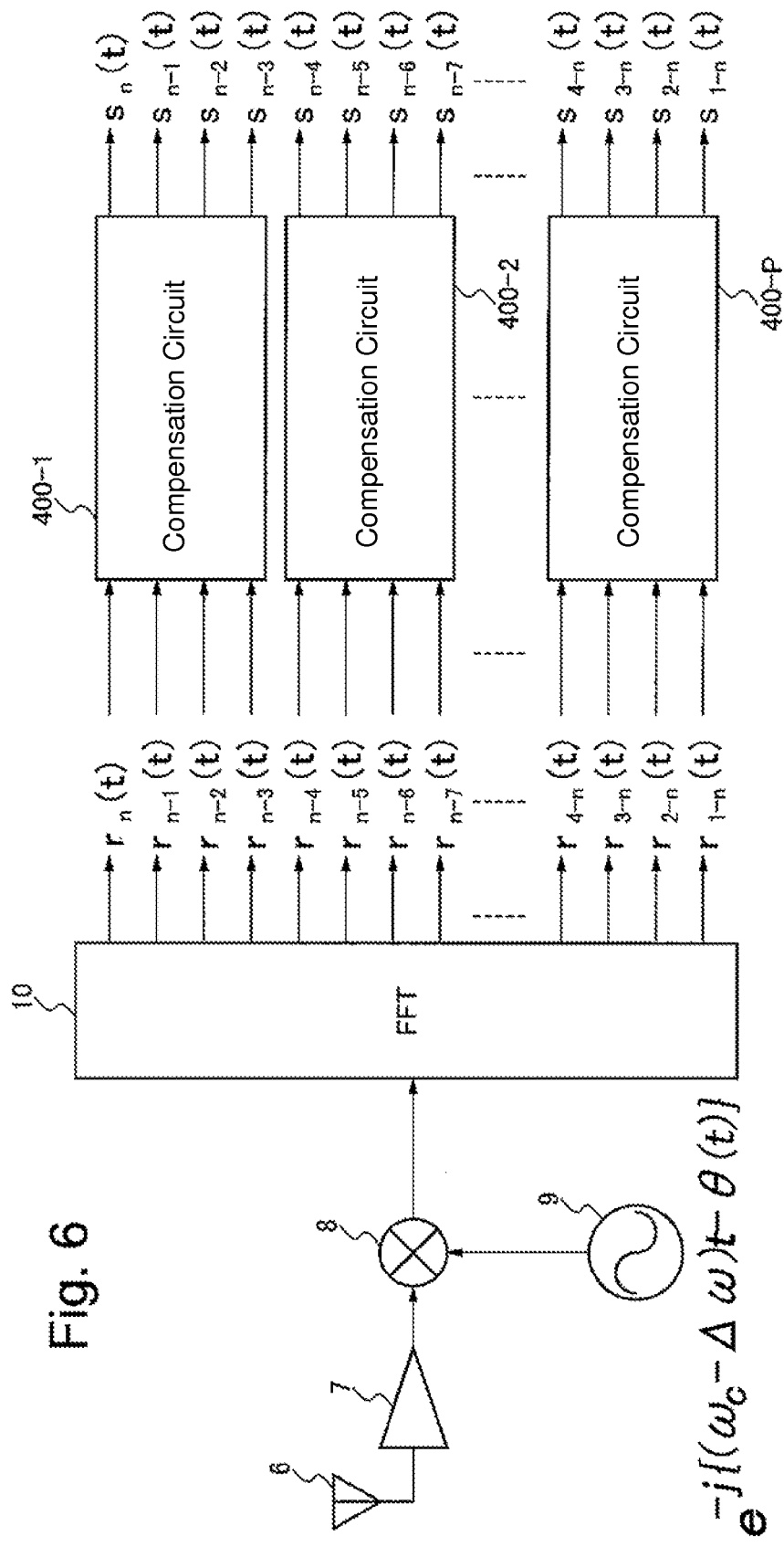
FIG. 6 is a block diagram showing a composition of the OFDM receiving device in the fourth exemplary embodiment of the present invention.

FIG. 6 is a block diagram showing the composition of the OFDM receiving device in the fourth exemplary embodiment of the present invention. Here, the equipment configuration of the transmitting device (not shown in FIG. 6), an antenna 6, an amplifier 7, an orthogonal demodulator 8, a local oscillator 9, and a Fourier transformer 10, are similar to the receiving device 52 described in FIG. 7.

According to the fourth exemplary embodiment, the Fourier transformer 10 executes Fourier transform for the demodulated OFDM signal. And the Fourier transformer 10 outputs demodulated signals $r_{1-n}(t)$, $r_{2-n}(t)$, $r_{3-n}(t)$, ..., $r_n(t)$ corresponding to 2n sub-carriers respectively to compensation circuit blocks 400-1 to 400-p for each group including L sub-carriers, where L×p=2n. Here, a case of L=4 is explained. FIG. 5 indicates a composition of a compensation circuit block for this case.

According to the fourth exemplary embodiment, the frequency drift and the phase noise can be compensated precisely for each of sub-carrier groups whose frequency is different each other. Accordingly, the fourth exemplary embodiment has a merit of compensating the frequency drift and the phase noise even though the phase noise changes depending on the frequency.

Further, in the fourth exemplary embodiment, the compensation circuit block using the extraction circuit that is the same configuration as the first exemplary embodiment is illustrated. In addition, the similar effect can be obtained even if the extraction circuit of the modification of the first exemplary embodiment, the second exemplary embodiment, or third exemplary embodiment is adopted as that of the fourth exemplary embodiment.

6. Fifth Exemplary Embodiment

Figure 9:
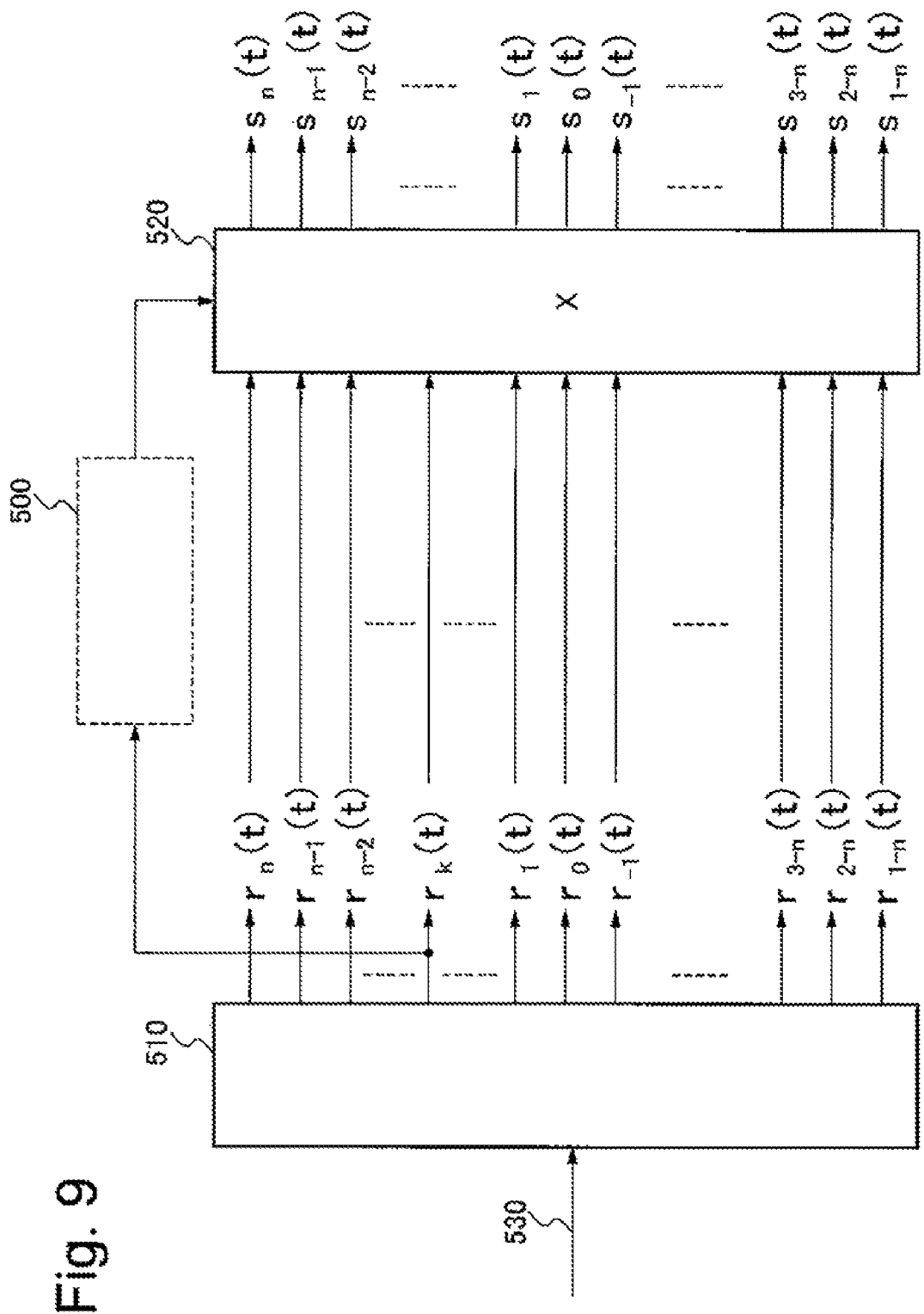
FIG. 9 is a block diagram showing a general composition of the OFDM receiving device in the fifth exemplary embodiment of the present invention.

FIG. 9 is the block diagram showing a general composition of the OFDM receiving device in the fifth exemplary embodiment of the present invention. The OFDM receiving device shown in FIG. 9 includes a converting means 510, an extracting means 500, and a compensating means 520. The converting means 510 converts the received OFDM signal 530 into the received signal for each sub-carrier. The extracting means extracts the ingredient caused by the frequency drift and the phase noise of the sub-carrier based on the received signal of a specific sub-carrier among the sub-carriers and a known modulation signal. The compensating means 520 compensates the frequency drift and the phase noise of the received signal of all sub-carriers using the ingredient caused by the frequency drift and the phase noise of the sub-carrier which the extracting means 500 extracted.

That is, for the OFDM receiving device whose configuration is shown in FIG. 9, in the same way as the above-mentioned first to fourth exemplary embodiments, the ingredient caused by the frequency drift $\Delta\omega$ and the phase noise from the sub-carrier can be removed without using a complicated configuration.

7. Sixth Exemplary Embodiment

Figure 10:
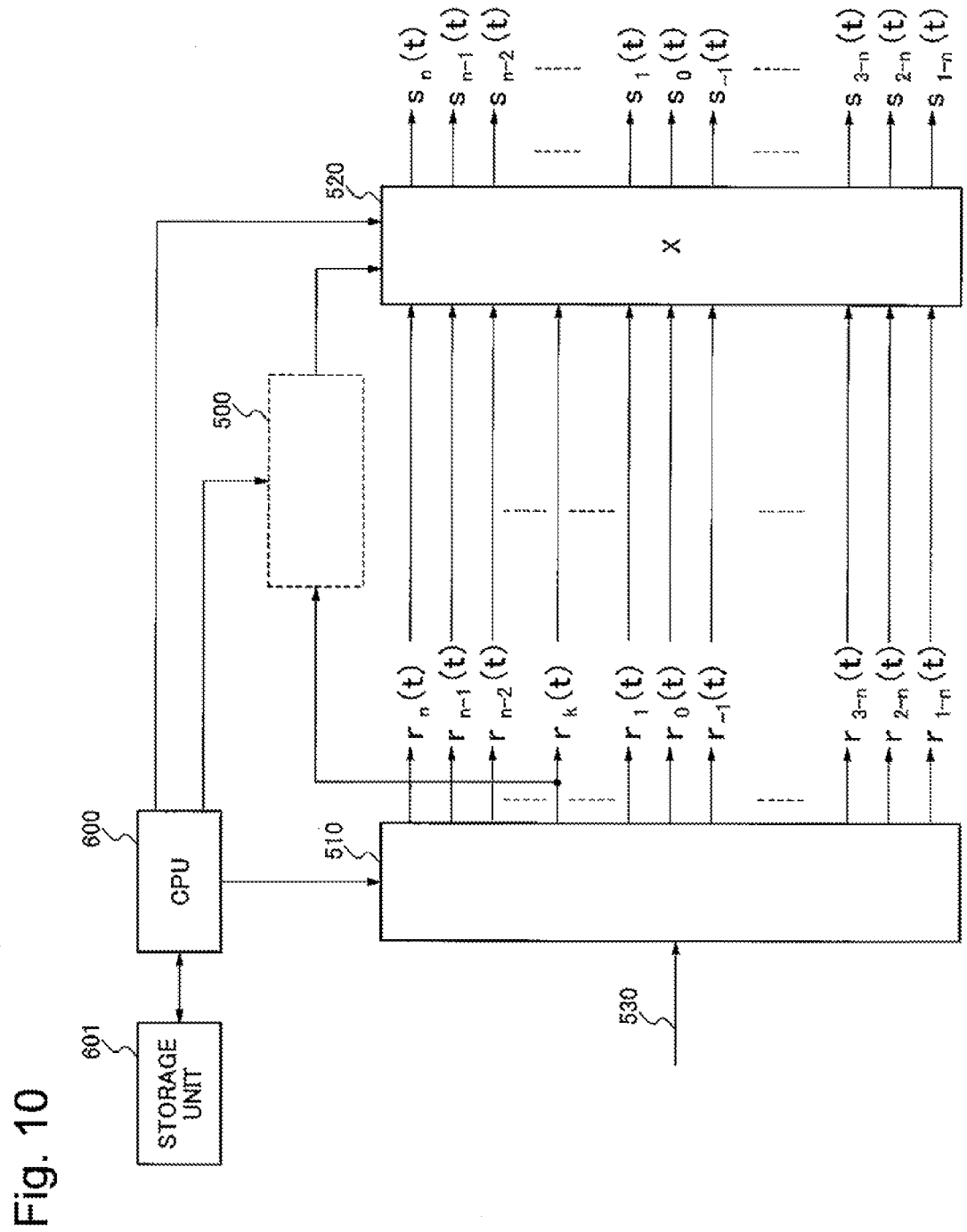
FIG. 10 is a diagram showing a composition of the OFDM receiving device in the sixth exemplary embodiment of the present invention.

FIG. 10 is a diagram showing a composition of the OFDM receiving device in the sixth exemplary embodiment of the present invention. The OFDM receiving device shown in FIG. 10 includes a central processing unit (CPU) 600 and a storage unit 601 in additions to the OFDM receiving device indicated in the fifth exemplary embodiment.

In the OFDM receiving device shown in FIG. 10, the storage unit 601 stores a program which controls the central processing unit 600. The program is stored from outside of the OFDM receiving device into the storage unit 601 using storage media.

Figure 11:
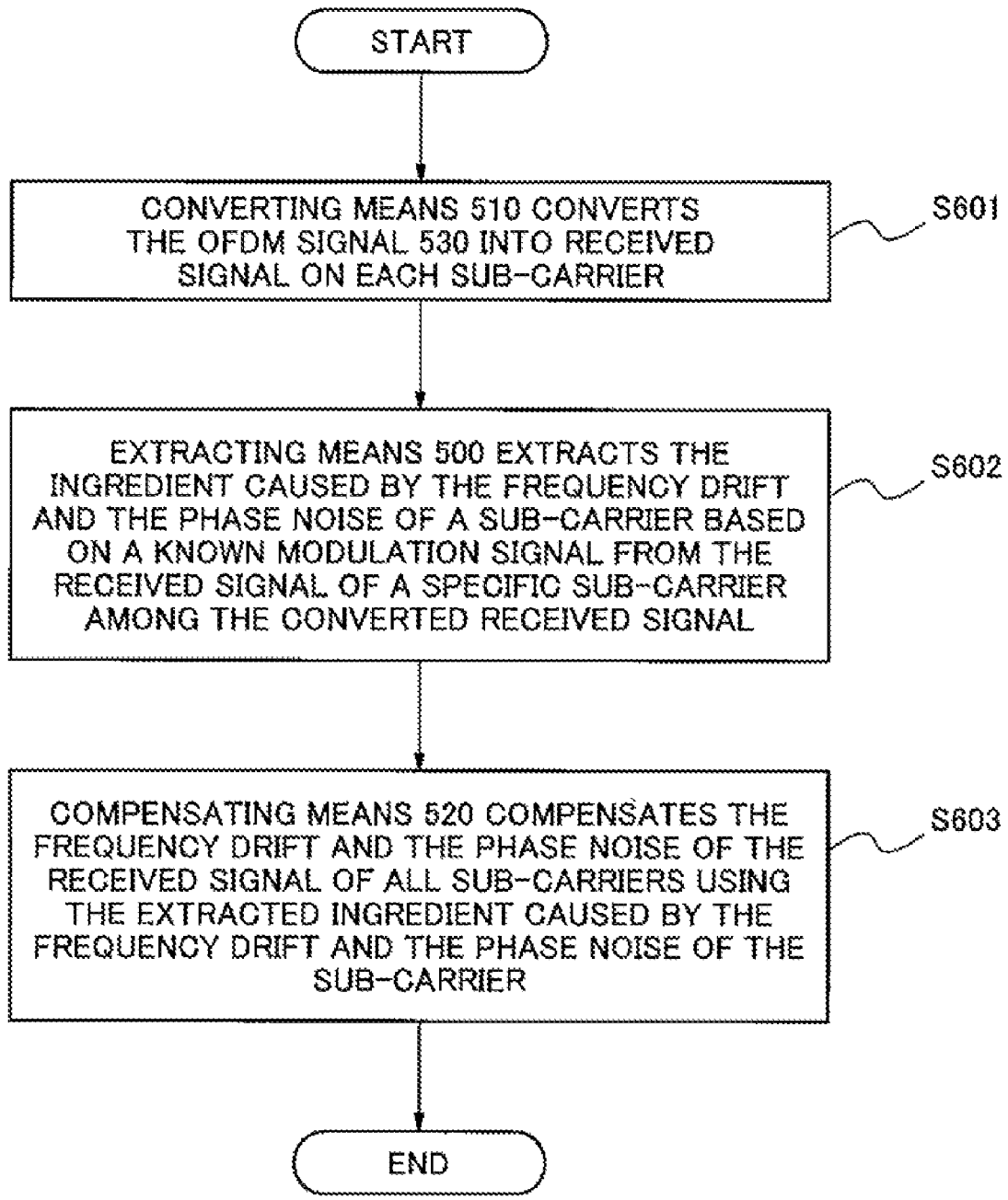
FIG. 11 is a diagram showing a processing procedure of a received signal of the OFDM receiving device in the sixth exemplary embodiment of the present invention.

And the central processing unit 600 controls a converting means 510, an extracting means 500, and a compensating means 520 based on the program stored in the storage unit 601 so as to perform the operation shown in FIG. 11.

FIG. 11 is a diagram showing a processing procedure of the received signal of the OFDM receiving device in the sixth exemplary embodiment of the present invention. In FIG. 11, the converting means 510 converts the OFDM signal 530 into the received signal on each sub-carrier (S601). The extracting means 500 extracts the ingredient caused by the frequency drift and the phase noise of the sub-carrier based on a known modulation signal from the received signal of a specific sub-carrier among the converted received signal (S602). And the compensating means 520 compensates the frequency drift and the phase noise of the received signal of all sub-carriers using the extracted ingredient caused by the frequency drift and the phase noise of the sub-carrier (S603). Because the OFDM receiving device is controlled by using a program, sixth exemplary embodiment has a merit of easily changing a control procedure by rewriting the program in addition to the merit of the fifth exemplary embodiment.

Further, even for the first to fourth exemplary embodiments, these exemplary embodiments can include the central processing unit and the storage unit. The present configuration makes it possible to control the compensation circuit including the Fourier transformer 10, the multiplier 20, the extraction circuits 100, 100a, 200, or 300, the compensation unit 20, and a compensation circuit blocks 400-1 to 400-p in the fourth exemplary embodiment by the central processing unit. As a result, in the first to fourth exemplary embodiments, with a configuration so as the central processing unit and the storage unit are included, a merit of easily changing the control procedure can be obtained by rewriting the program.

As a summary, the present invention has been described with reference to first to sixth exemplary embodiments. While having described an invention of the present application referring to the exemplary embodiments, the invention of the present application is not limited to the above mentioned exemplary embodiments. It is to be understood that to the configurations and details of the invention of the present application, various changes can be made within the scope of the invention of the present application by those skilled in the arts.

This application is the National Phase of PCT/JP2009/051676, filed Jan. 27, 2009, which claims priority from Japanese Patent Application No. 2008-023749, filed on Feb. 4, 2008, the contents of which are incorporated herein by the reference in their entirety.

AVAILABILITY IN THE INDUSTRY

The present invention is applicable to a terminal side receiving device of the OFDM communication system such as a Worldwide Interoperability for Microwave Access (WiMAX) or the like which is used for the mobile communications systems.

The invention claimed is:

1. An Orthogonal Frequency Division Multiplex (OFDM) receiving device, comprising:
a converting unit for converting a received OFDM signal where no smaller than one specific sub-carriers among plurality of sub-carriers are modulated by a known modulation signal into a received signal of each sub-carrier;
an extracting unit for extracting an ingredient caused by a frequency drift and a phase noise of said sub-carrier based on the received signal of said specific sub-carrier and said known modulation signal; and
a compensating unit for compensating the received signal of said sub-carrier using said extracted ingredient,
wherein said extracting unit further comprises:
a reciprocal calculating unit for calculating a reciprocal of the received signal of said specific sub-carrier and generates a reciprocal signal; and
a multiplying unit for multiplying said reciprocal signal by said known modulation signal and generates the ingredient caused by said frequency drift and phase noise.

2. An Orthogonal Frequency Division Multiplex (OFDM) receiving device, comprising:
a converting unit for converting a received OFDM signal where no smaller than one specific sub-carriers among plurality of sub-carriers are modulated by a known modulation signal into a received signal of each sub-carrier;
an extracting unit for extracting an ingredient caused by a frequency drift and a phase noise of said sub-carrier based on the received signal of said specific sub-carrier and said known modulation signal; and
a compensating unit for compensating the received signal of said sub-carrier using said extracted ingredient,
wherein said known modulation signal is a constant value and does not change in terms of time, and
said extracting unit has a reciprocal calculating unit for calculating the reciprocal of the received signal of said specific sub-carrier and generates the ingredient caused by said frequency drift and phase noise.

3. An Orthogonal Frequency Division Multiplex (OFDM) receiving device, comprising:
a converting unit for converting a received OFDM signal where no smaller than one specific sub-carriers among plurality of sub-carriers are modulated by a known modulation signal into a received signal of each sub-carrier;
an extracting unit for extracting an ingredient caused by a frequency drift and a phase noise of said sub-carrier based on the received signal of said specific sub-carrier and said known modulation signal; and
a compensating unit for compensating the received signal of said sub-carrier using said extracted ingredient,
wherein said extracting unit further comprises:
a reciprocal calculating unit for calculating the reciprocal of the received signal of no smaller than two specific sub-carriers respectively and generates the reciprocal signals;
a multiplying unit for multiplying no smaller than two said reciprocal signals by the known modulation signals of no smaller than two said specific sub-carriers respectively, and generating ingredients caused by the frequency drift and the phase noise respectively on each no smaller than two said specific sub-carriers; and
an averaging unit for generating said extracted ingredient by averaging the ingredients caused by the frequency drift and the phase noise of no smaller than two said specific sub-carriers.

4. An Orthogonal Frequency Division Multiplex (OFDM) receiving device, comprising:
a converting unit for converting a received OFDM signal where no smaller than one specific sub-carriers among plurality of sub-carriers are modulated by a known modulation signal into a received signal of each sub-carrier;
an extracting unit for extracting an ingredient caused by a frequency drift and a phase noise of said sub-carrier based on the received signal of said specific sub-carrier and said known modulation signal; and
a compensating unit for compensating the received signal of said sub-carrier using said extracted ingredient,
wherein said extracting unit further comprises:
a complex conjugation calculating unit for calculating a complex conjugation of the received signal of said specific sub-carrier and generates a complex conjugation signal;
a multiplying unit for multiplying said complex conjugation signal by said known modulation signal; and a normalizing unit for normalizing said multiplication result and generating said extracted ingredient.

5. An Orthogonal Frequency Division Multiplex (OFDM) receiving device, comprising:
a converting unit for converting a received OFDM signal where no smaller than one specific sub-carriers among plurality of sub-carriers are modulated by a known modulation signal into a received signal of each sub-carrier;
an extracting unit for extracting an ingredient caused by a frequency drift and a phase noise of said sub-carrier based on the received signal of said specific sub-carrier and said known modulation signal; and
a compensating unit for compensating the received signal of said sub-carrier using said extracted ingredient,
wherein said extracting unit further comprises:
a complex conjugation calculating unit for calculating the complex conjugations of the received signals of no smaller than two specific sub-carriers and generating the complex conjugation signals;
a multiplying unit for multiplying no smaller than two said reciprocal signals by the known modulation signal of no smaller than two said specific sub-carriers respectively;
a normalizing unit for normalizing no smaller than two said multiplication results and generating the ingredients caused by the frequency drift and the phase noise; and
an averaging unit for generating said extracted ingredient by averaging the ingredients caused by the frequency drift and the phase noise of no smaller than two said specific sub-carriers.

6. An OFDM receiving device, comprising:
a converting unit for converting the received OFDM signal where plurality of sub-carriers of the OFDM signal are divided into plurality of groups and the OFDM receiving devices receives an OFDM signal where at least one specific sub-carrier is modulated by a known modulation signal on each group into the received signal for each said sub-carrier; and
a compensation circuit block installed in said each plurality of groups, wherein each compensation circuit block comprising;
an extracting unit for extracting an ingredient caused by a frequency drift and a phase noise of said sub-carrier based on the received signal of the specific sub-carrier of the group and a known modulation signal of the sub-carrier; and
a compensating unit for compensating the received signal of the sub-carrier of the group using said extracted ingredient.

7. The OFDM receiving device according to claim 6, wherein said extracting unit further comprises:
a reciprocal calculating unit for calculating a reciprocal of the received signal of said specific sub-carrier and generating a reciprocal signal; and
a multiplying unit for multiplying said reciprocal signal by said known modulation signal and generating the ingredient caused by said frequency drift and phase noise.

8. The OFDM receiving device according to claim 6, wherein said extracting unit further comprises:
a reciprocal calculating unit for calculating the reciprocal of no smaller than two received signals of the specific sub-carrier respectively and generating the reciprocal signals;
a multiplying unit for multiplying no smaller than two said reciprocal signals by the known modulation signal of no smaller than two said specific sub-carriers respectively and generating the ingredients caused by the frequency drift and the phase noise of no smaller than two said specific sub-carriers respectively; and
an averaging unit for generating said extracted ingredient by averaging the ingredients caused by the frequency drift and the phase noise in no smaller than two said specific sub-carriers.

9. The OFDM receiving device according to claim 6, wherein said extracting unit further comprises:
a complex conjugation calculating unit for calculating a complex conjugation of the received signal of said specific sub-carrier and generates the complex conjugation signal;
a multiplying unit for multiplying said complex conjugation signal by said known modulation signal; and
a normalizing unit for normalizing said multiplication result and generating said extracted ingredient.

10. The OFDM receiving device according to claim 6, wherein said extracting unit further comprises:
a complex conjugation calculating unit for calculating the complex conjugations of the received signals of no smaller than two specific sub-carriers and generating the complex conjugation signals;
a multiplying unit for multiplying no smaller than two said reciprocal signals by the known modulation signals of no smaller than two said specific sub-carriers respectively;
a normalizing unit for normalizing no smaller than two said multiplication results and generating the ingredients caused by the frequency drift and the phase noise; and
an averaging unit for generating said extracted ingredient by averaging the ingredients caused by the frequency drift and the phase noise in no smaller than two said specific sub-carriers.

11. The OFDM receiving device according to claim 4, wherein
said specific sub-carrier is BPSK signal or QPSK signal which is modulated by a pattern signal that changes periodically at a pre-defined cycle.

12. An OFDM receiving method comprising:
converting, by a converting unit, the received OFDM signal where no smaller than one specific sub-carrier among plurality of sub-carriers are modulated by a known modulation signal into a received signal for each sub-carrier;
extracting, by an extracting unit, an ingredient caused by a frequency drift and a phase noise of said sub-carrier based on the received signal of said specific sub-carrier and said known modulation signal;
compensating, by a compensating unit, the received signal of the sub-carrier using said extracted ingredient;
calculating, by a reciprocal calculation unit, a reciprocal of the received signal of said specific sub-carrier and generating a reciprocal signal; and
multiplying, by a multiplying said reciprocal signal by said known modulation signal and generating, b the multiplying the ingredient caused by the said frequency drift and phase noise.

13. An OFDM servicing method comprising:
converting, by a converting unit, the received OFDM signal where no smaller than one specific sub-carrier among plurality of sub-carriers are modulated by a known modulation signal into a received signal for each sub-carrier;
extracting, by an extracting unit, an ingredient caused by a frequency drift and a phase noise of said sub-carrier based on the received signal of said specific sub-carrier and said known modulation signal; and compensating, by a compensating unit, the received signal of the sub-carrier using said extracted ingredient, wherein
said known modulation signal is a constant value which does not change in terms of time, and
the reciprocal of the received signal of said specific sub-carrier is calculated and the ingredient caused by said frequency drift and phase noise is generated.

14. An OFDM servicing method comprising:
converting, by a converting unit, the received OFDM signal where no smaller than one specific sub-carrier among plurality of sub-carriers are modulated by a known modulation signal into a received signal for each sub-carrier;
extracting, by an extracting unit, an ingredient caused by a frequency drift and a phase noise of said sub-carrier based on the received signal of said specific sub-carrier and said known modulation signal; and
compensating, by a compensating unit, the received signal of the sub-carrier using said extracted ingredient,
calculating, by a reciprocal calculation unit, the reciprocals of the received signals of no smaller than two specific sub-carriers respectively and generating, by a reciprocal calculation unit the reciprocal signals;
multiplying, by a multiplying unit no smaller than two said reciprocal signals by the known modulation signal of no smaller than two said specific sub-carriers respectively and generating, b the multiplying unit the ingredients caused by the frequency drift and the phase noise in no smaller than two said specific sub-carriers respectively; and
generating, by an averaging unit, said extracted ingredient by averaging the ingredients caused by the frequency drift and the phase noise in no smaller than two said specific sub-carriers.

15. An OFDM servicing method comprising:
converting, by a converting unit, the received OFDM signal where no smaller than one specific sub-carrier among plurality of sub-carriers are modulated by a known modulation signal into a received signal for each sub-carrier;
extracting, by an extracting unit, an ingredient caused by a frequency drift and a phase noise of said sub-carrier based on the received signal of said specific sub-carrier and said known modulation signal; and
compensating, by a compensating unit, the received signal of the sub-carrier using said extracted ingredient,
calculating, a complex conjugation of the received signal of said specific sub-carrier and generating, by the complex conjugation calculating unit, a complex conjugation signal;
multiplying, by a multiplying said complex conjugation signal by said known modulation signal; and
normalizing, by a normalizing unit, said multiplication result and generating, by the normalizing unit, said extracted ingredient.

16. An OFDM servicing method comprising:
converting, by a converting unit, the received OFDM signal where no smaller than one specific sub-carrier among plurality of sub-carriers are modulated by a known modulation signal into a received signal for each sub-carrier;
extracting, by an extracting unit, an ingredient caused by a frequency drift and a phase noise of said sub-carrier based on the received signal of said specific sub-carrier and said known modulation signal; and
compensating, by a compensating unit, the received signal of the sub-carrier using said extracted ingredient,
calculating, b a complex conjugation calculation unit, a complex conjugation of the received signals of no smaller than two specific sub-carriers and generating, by a complex conjugation calculating unit, the complex conjugation signals;
multiplying, by a multiplying no smaller than two reciprocal signals by the known modulation signal of no smaller than two said specific sub-carriers respectively;
normalizing, by a normalizing unit, no smaller than two said multiplication results and generating, by a normalizing unit, the ingredients caused by the frequency drift and the phase noise; and
averaging, by an averaging unit said ingredients caused by the frequency drift and the phase noise in no smaller than two said specific sub-carriers and generating extracted ingredient.

17. The OFDM receiving device according to claim 6, wherein said specific sub-carrier is BPSK signal or QPSK signal which is modulated by a pattern signal that changes periodically at a pre-defined cycle.

\* \* \* \* \*